United States Patent [19]

Nakayama et al.

[11] Patent Number: 5,656,564
[45] Date of Patent: Aug. 12, 1997

[54] ZIRCONIA-BASED SINTER, PROCESS FOR PRODUCING THE SAME, GRINGING PART MATERIAL, AND BRACKET MATERIAL FOR DENTAL CORRECTION

[75] Inventors: Susumu Nakayama, Okayama; Terumitsu Ichimori, Saitama; Tadahiro Mino, Okayama; Nobuo Ayuzawa, Hyogo, all of Japan

[73] Assignee: Shinagawa Refractories Co., Ltd., Tokyo, Japan

[21] Appl. No.: 564,236

[22] PCT Filed: Apr. 19, 1995

[86] PCT No.: PCT/JP95/00762

§ 371 Date: Dec. 20, 1995

§ 102(e) Date: Dec. 20, 1995

[87] PCT Pub. No.: WO95/29141

PCT Pub. Date: Nov. 2, 1995

[30] Foreign Application Priority Data

Apr. 22, 1994 [JP] Japan .................................. 6-107636
Mar. 17, 1995 [JP] Japan .................................. 7-086509

[51] Int. Cl.$^6$ .................................................. C04B 35/486
[52] U.S. Cl. ........................... 501/103; 501/104; 51/309; 433/8
[58] Field of Search .................................. 501/103, 104; 264/65; 51/309; 433/8

[56] References Cited

U.S. PATENT DOCUMENTS

| | | | |
|---|---|---|---|
| 4,360,598 | 11/1982 | Otagiri et al. | 501/103 |
| 4,915,625 | 4/1990 | Tsukuma et al. | 501/103 |
| 5,180,696 | 1/1993 | Inoue | 501/103 |
| 5,219,895 | 6/1993 | Yoshida et al. | 501/103 |
| 5,263,858 | 11/1993 | Yoshida et al. | 433/8 |
| 5,279,995 | 1/1994 | Tanaka et al. | 501/103 |

FOREIGN PATENT DOCUMENTS

| | | |
|---|---|---|
| 63-252963 | 10/1988 | Japan . |
| 2-21857 | 1/1990 | Japan . |
| 3-237059 | 10/1991 | Japan . |
| 4-280864 | 10/1992 | Japan . |
| 4-349172 | 12/1992 | Japan . |

*Primary Examiner*—Karl Group
*Attorney, Agent, or Firm*—Sughrue, Mion, Zinn, Macpeak & Seas

[57] ABSTRACT

A zirconia-based sinter containing a boron compound and stabilized with a rare earth metal oxide is provided which has excellent fracture toughness, mechanical strength and thermal stability. A zirconia-based sinter comprising $ZrO_2$ as the main component, one or more rare earth metal oxides, $R_2O_3$, selected from $Yb_2O_3$, $Er_2O_3$, $Ho_2O_3$, $Y_2O_3$, and $Dy_2O_3$, and a boron compound or a boron compound and $Al_2O_3$ and/or $SiO_2$, wherein the molar proportion of $R_2O_3/ZrO_2$ is from 1.3/98.7 to 2/98, excluding 2/98, and the content of boron components is from 0.05 to 8% by mole in terms of $B_2O_3$ or in addition thereto the content of $Al_2O_3$ is from 0.1 to 5% by mole and/or the content of $SiO_2$ is from 0.05 to 1.5% by mole. A grinding part material and a bracket material for dental correction constituted of the zirconia-based sinter are provided.

6 Claims, No Drawings

ZIRCONIA-BASED SINTER, PROCESS FOR PRODUCING THE SAME, GRINGING PART MATERIAL, AND BRACKET MATERIAL FOR DENTAL CORRECTION

TECHNICAL FIELD

The present invention relates to a zirconia-based sinter and a process for producing the same, and to a grinding part material and a bracket material for dental correction both constituted of said zirconia-based sinter. More particularly, this invention relates to a zirconia-based sinter stabilized with a rare earth metal oxide which sinter has high fracture toughness properties, is excellent in mechanical strength and thermal stability, and contains a boron compound, a process for producing said sinter, and a grinding part material and a bracket material for dental correction both constituted of said zirconia-based sinter.

BACKGROUND ART

In recent years, a zirconia ($ZrO_2$)-based sinter is extensively used as a constituent material of, e.g., ceramic scissors and medical materials taking advantage of its toughness, mold extrusion dies taking advantage of its lubricity, heat-insulating engine parts taking advantage of its heat-insulating properties and thermal expansion characteristics, or oxygen sensors and fuel cells taking advantage of its oxygen ion conductivity. It is known that of such sinters the zirconia-based sinters containing a rare earth metal oxide as a stabilizer have exceedingly high fracture toughness properties as compared with other ceramics. Products taking advantage of this property are being developed enthusiastically. For example, attention is focused on use as a grinding part material, e.g., a grinding medium for use in the mixing or grinding of ceramic materials, metal powders, food-related substances, or the like. Also attracting attention is use as a bracket material for dentition correction which is superior in aesthetic property to bracket materials made of metal, polymer, etc., and combines high strength and toughness.

By the way, the fracture toughness properties of a zirconia-based sinter containing a rare earth metal oxide as a stabilizer tend to decrease in proportion to the amount of the stabilizer and to sintering temperature. For example, it is known that zirconia-based sinters having a stabilizer content lower than 2% by mole show excellent fracture toughness properties.

Consequently, the tendency described above indicates that a zirconia-based sinter having high fracture toughness properties can be obtained if a raw material containing a stabilizer in an amount smaller than 2% by mole (hereinafter abbreviated simply as "low-mole") is used and can be sintered at a low temperature.

However, it is extremely difficult to sinter zirconia with a low-mole stabilizer. In addition, zirconia-based sinters containing a rare earth metal oxide as a stabilizer generally have a drawback that they are susceptible to deterioration during long-term aging in a low-temperature region (the deterioration being caused by the transition of tetragonal crystals, which constitute a metastable phase at ordinary temperature among the crystal phases of the zirconia-based sinter, to monoclinic crystals, which constitute a stable phase, and by the development of minute cracks within the sinter as a result of a volume expansion accompanying the phase transition). In particular, aging in water or steam at 100° to 300° C. is a cause of considerable deterioration, and zirconia-based sinters stabilized with a low-mole stabilizer are more apt to undergo such a phenomenon.

The prior art techniques have therefore had a problem that a zirconia-based sinter having high toughness properties is difficult to produce. Even if a zirconia-based sinter having high toughness is produced, this kind of highly tough zirconia-based sinters have drawbacks of poor thermal stability in a low-temperature region and impaired product reliability and, hence, have a problem that the applications thereof are considerably limited.

Grinding part materials comprising a zirconia-based sinter excellent in strength and wear resistance have been proposed so far (see, e.g., examined Japanese patent publication No. 20587/1990). However, since these prior art zirconia-based sinters undergo a considerable decrease in strength upon long-term standing at around 100° to 300° C. and the rate thereof (rate of strength decrease) is exceedingly high especially in a water or steam atmosphere, the sinters raise difficulties, for example, in a wet grinding step using water as solvent or in the case where grinding part materials are washed with water etc., before being subjected to a drying step at a high temperature (around 200° C.). As a sinter which eliminates such a problem, a zirconia-based sinter containing both a boric acid compound (e.g., $B_2O_3$) and $Al_2O_3$ and/or $SiO_2$ [and further containing a rare earth metal oxide in an amount of 2% by mole or larger] has been proposed in unexamined published Japanese patent application No. 239662/1994 and others.

Such zirconia-based sinters show improved thermal stability. However, since these zirconia-based sinters contain 2% by mole or more rare earth metal oxide as a stabilizer, they neither show excellent fracture toughness properties comparable to that of zirconia-based sinters having a stabilizer content lower than 2% by mole, nor satisfy all the properties including fracture toughness properties and wear resistance.

On the other hand, bracket materials for dentition correction which comprise a zirconia-based sinter as a material similar to teeth in appearance and color tone and excellent in strength and toughness have been proposed in French patent No. 2,559,059, unexamined published Japanese patent application No. 21857/1990, unexamined published Japanese patent application No. 280864/1992, and others. For example, in unexamined published Japanese patent application No. 21857/1990 is described use of a zirconia-based sinter as a bracket material for dentition correction which sinter is a "so-called partially stabilized zirconia" partially stabilized with $Y_2O_3$ or the like. In unexamined published Japanese patent application No. 280864/1992 is described use of a partially stabilized zirconia as a bracket material for dentition correction which zirconia contains a colorant comprising erbium oxide, praseodymium oxide, and iron oxide and is very similar in color tone to human teeth.

However, such prior art zirconia-based sinters also undergo a considerable decrease in strength upon long-term standing at around 100° to 300° C., and the rate thereof (rate of strength decrease) is exceedingly high especially in a water or steam atmosphere. The decrease of strength proceeds even at lower temperatures.

Medical materials including bracket materials for dentition correction raise difficulties, because these materials are especially frequently subjected at a high-temperature (around 100° to 300° C.) to cleaning with water as a solvent, disinfection, sterilization, or another treatment. As a sinter which eliminates such a problem, a zirconia-based sinter containing both a boron compound (e.g., $B_2O_3$) and $Al_2O_3$ and/or $SiO_2$ [and further containing a rare earth metal oxide in an amount of 2% by mole or larger] has been proposed in Japanese patent application No. 169453/1994 and others. Such zirconia-based sinters show improved thermal stability. However, since these zirconia-based sinters contain 2% by mole or larger rare earth metal oxide as a stabilizer, they neither show excellent fracture toughness properties comparable to that of zirconia-based sinters having a stabilizer content lower than 2% by mole, nor satisfy all the properties including fracture toughness properties.

The present invention has been achieved in view of the drawbacks and problems described above. Objects of the present invention are as follows:

the first object is to provide a zirconia-based sinter which contains a low-mole rare earth metal oxide as a stabilizer, can be produced through sintering at a relatively low temperature, and is excellent in thermal stability and fracture toughness properties, and to provide a process for producing the same;

the second object is to provide a grinding part material which employs the zirconia-based sinter described above and a zirconia-based sinter obtained by the process for producing the same; and the third object is to provide a bracket material for dentition correction which likewise employs the zirconia-based sinter described above and a zirconia-based sinter obtained by the process for producing the same.

DISCLOSURE OF THE INVENTION

The zirconia-based sinter according to the present invention is characterized as being obtained by sintering a composition comprising $ZrO_2$ as the main component, a rare earth metal oxide ($R_2O_3$) in a given range, and a boron compound in a given range (or a boron compound in a given range and $Al_2O_3$ and/or $SiO_2$ in a given range). Thus, a zirconia-based sinter excellent in thermal stability and fracture toughness properties is provided.

Further, the process according to the present invention for producing a zirconia-based sinter is characterized as comprising preparing a raw-material blend by a chemical synthesis method, such as the neutralizing coprecipitation method, the hydrolytic method, the alkoxide method, or the like, or by the oxide-mixing method so as to result in a given raw-material composition, calcining the blend at a given temperature (500° to 1,200° C.), subjecting the calcination product to a pulverization step to obtain a raw-material powder having a given specific surface area (which is 3 $m^2/g$ or larger when the blend was obtained by a chemical synthesis method, or is 10 $m^2/g$ or larger when the blend was obtained by the oxide-mixing method), subsequently molding the raw-material powder, and then sintering the molding at a given temperature (1,300° to 1,650° C.). Thus, sintering can be conducted at a relatively low temperature, and a zirconia-based sinter excellent in thermal stability and fracture toughness properties can be obtained.

Furthermore, the grinding part material and the bracket material for dentition correction according to the present invention are characterized as employing the zirconia-based sinter described above and a zirconia-based sinter obtained by the production process described above which zirconia-based sinters each has given property values.

BEST MODES FOR CARRYING OUT THE INVENTION

Detailed explanations are given below in order on the zirconia-based sinter of the present invention, the process for producing the same, and the grinding part material and the bracket material for dental correction both employing the zirconia-based sinter.

First, the zirconia-based sinter according to the present invention is explained in detail.

As stated above, the zirconia-based sinter according to the present invention contains $ZrO_2$ as the main component and employs as a stabilizer one or more rare earth metal oxides selected from the group consisting of $Yb_2O_3$, $Er_2O_3$, $Ho_2O_3$, $Y_2O_3$, and $Dy_2O_3$ (in this specification, the rare earth metal oxides are abbreviated as "$R_2O_3$"). (Although $Tm_2O_3$ and $Lu_2O_3$ are also usable, $Tm_2O_3$ and $Lu_2O_3$ are highly expensive to make zirconia products poorly competitive in the market).

The sinter may also contain a rare earth metal oxide other than the aforementioned $R_2O_3$, as long as the content thereof is 0.5% by mole or lower based on $ZrO_2$-$R_2O_3$; this sinter is also included in the present invention. In this case, the presence of a rare earth metal oxide other than the aforementioned $R_2O_3$ does not bring about a noticeable change in mechanical strength as long as the content thereof is 0.5% by mole or lower based on $ZrO_2$-$R_2O_3$. However, contents thereof not lower than 0.5% by mole are undesirable in that mechanical strength decreases.

The proportion of this stabilizer ($R_2O_3$) is characterized in that the molar proportion thereof to $ZrO_2$ ($R_2O_3/ZrO_2$) is from 1.3/98.7 to 2/98, excluding 2/98. If the molar proportion of the stabilizer ($R_2O_3$) to $ZrO_2$ is below 1.3/98.7, the desired sinter is difficult to obtain because tetragonal crystals of $ZrO_2$ are hardly maintained at ordinary temperature and the transition of the tetragonal crystals to monoclinic crystals results in a volume change, which is accompanied by cracking. In short, such proportions are undesirable because the effect of the stabilizer is insufficient (see "Composition No. 18" in Tables 1 and 2 given later and "Composition No. 44" in Tables 4 and 6). On the other hand, molar proportions of the stabilizer ($R_2O_3$) to $ZrO_2$ of 2/98 and higher are undesirable in that although a zirconia-based sinter excellent in sintering property and mechanical strength is obtained, this sinter hardly has the high fracture toughness properties desired in this invention and, hence, the high-toughness zirconia-based sinter of the present invention cannot be obtained (see "Composition No. 20" in Tables 1 and 3 given later and "Composition No. 46" in Tables 4 and 6). Therefore, in the zirconia-based sinter according to the present invention, the molar proportion of the $R_2O_3$ to $ZrO_2$ ($R_2O_3/ZrO_2$) is desirably from 1.3/98.7 to 2/98, excluding 2/98, with the preferred range thereof being from 1.5/98.5 to 2/98, excluding 2/98.

The zirconia-based sinter according to the present invention is further characterized in that it contains a boron (B) component therein. This boron component is an additive capable of improving the thermal stability of zirconia-based sinters. However, if the amount of boron (B) is smaller than 0.05% by mole in terms of $B_2O_3$, it does not produce the effect of improving thermal stability (see "Composition Nos. 1 and 2" in Tables 1 and 2 given later and "Composition Nos. 27 and 28" in Tables 4 and 5). In contrast, sinters having a boron amount exceeding 8% by mole are undesirable in that the boron compound tends to reduce rather than increase the thermal stability of the sinters (see "Composition No. 5" in Tables 1 and 2 given later and "Composition No. 31" in Tables 4 and 5). Therefore, the amount of boron (B) is from 0.05 to 8% by mole, preferably from 0.2 to 5% by mole, in terms of $B_2O_3$.

In the present invention, a compound of boron may be used as an additive (boron source) for incorporating a boron component. Examples thereof include boron oxide, boron nitride, boron carbide, or compounds of Zr, Al, Si, Yb, Er, Ho, Y, or Dy with boron (B).

$Al_2O_3$ and/or $SiO_2$ may be added to the zirconia-based sinter according to the present invention for the purpose of further improving thermal stability, improving sintering properties, etc. The sinter desirably has an $Al_2O_3$ amount in the range of from 0.1 to 5% by mole (preferably from 0.3 to 2% by mole) and an $SiO_2$ amount in the range of from 0.05 to 1.5% by mole (preferably from 0.1 to 0.5% by mole). In sinters having an $Al_2O_3$ amount smaller than 0.1% by mole or an $SiO_2$ amount smaller than 0.05% by mole, the effect of addition of the individual elements is not produced. On the other hand, zirconia-based sinters containing $Al_2O_3$ in an amount exceeding 5% by mole are undesirable in that fracture toughness properties decrease in proportion to the amount of $Al_2O_3$ (see "Composition No. 13" in Tables 1 and 2 given later and "Composition No. 39" in Tables 4 and 5). Further, zirconia-based sinters containing $SiO_2$ in an amount exceeding 1.5% by mole are undesirable in that the thermal stability obtained by the effect of boron incorporation described above tends to be reduced (see "Composition No. 15" in Tables 1 and 2 given later and "Composition No. 41" in Tables 4 and 5).

In the zirconia-based sinter according to the present invention, the incorporation of $Al_2O_3$ or $SiO_2$ produces the effects thereof not only in the case of incorporating three components of "$B_2O_3$-$Al_2O_3$-$SiO_2$", but also in the case of incorporating two components of "$B_2O_3$-$Al_2O_3$" or "$B_2O_3$-$SiO_2$" as long as the addition amounts thereof are within the respective ranges specified above (see "Composition Nos. 6 and 7" in Tables 1 and 2 given later and "Composition Nos. 32 and 33" in Tables 4 and 5). Additives for these (Al source and Si source) may be the oxides of these additive components (Al and Si). Besides these, the elements may also be added in the form of nitride, carbide, hydroxide, or the like to obtain the same effects. All of these are included in the present invention.

The process according to the present invention for producing a zirconia-based sinter is then explained.

First, using a chemical synthesis method, such as the neutralizing coprecipitation method, the hydrolytic method, the alkoxide method, or the like, or using the oxide-mixing method, a raw-material powder is prepared so that the powder has the above-specified raw-material composition concerning $ZrO_2$, $R_2O_3$, and a boron compound (and $Al_2O_3$ and/or $SiO_2$ according to need). Subsequently, this raw-material powder is calcined in the temperature range of from 500° to 1,200° C. The calcined powder is pulverized and then molded. The molding is subjected to sintering (main burning) in the temperature range of from 1,300° to 1,650° C.

In the production process of the present invention, the calcination at 500° to 1,200° C. is intended to homogenize the raw material as much as possible and to cause part of the $ZrO_2$ to undergo phase transition so as to accelerate sintering in the burning step (main burning step). This calcination is one of the important requisites to the production process of the present invention. The lower limit, 500° C., in the calcination conditions is the minimum temperature at which part of the monoclinic crystals of $ZrO_2$ can be phase-transferred to tetragonal crystals by calcination. It is generally said that the transfer of monoclinic crystals of $ZrO_2$ to tetragonal crystals occurs at around 1,170° C. However, adding a stabilizer to $ZrO_2$ shifts the transition temperature to the lower-temperature side. For example, in compositions containing $Y_2O_3$ as a stabilizer, the phase transition occurs at a temperature around 800° C. This temperature varies depending on the kind or amount of the stabilizer.

On the other hand, the upper limit of calcination temperature, 1,200° C., is the maximum temperature at which a calcined raw material containing aggregates which are sufficiently pulverizable in a pulverization step can be produced. Raw materials calcined at a temperature exceeding that temperature are undesirable in that aggregates remain after pulverization, which serve as large breaking sites to reduce the strength of the zirconia-based sinter. Therefore, the calcination temperature in the process of the present invention is preferably from 500° to 1,200° C.

The raw material which has undergone calcination should be pulverized because it has aggregated in some degree. The specific surface area of the raw-material powder obtained by this pulverization should be 3 $m^2/g$ or larger when the raw material was obtained by a chemical synthesis method, or should be 10 $m^2/g$ or larger when the raw material was obtained by the oxide-mixing method. The specific surface area thereof is preferably in the range of from 8 to 20 $m^2/g$ when the raw material was obtained by a chemical synthesis method, or in the range of from 15 to 30 $m^2/g$ when the raw material was obtained by the oxide-mixing method. Raw-material powders having a specific surface area smaller than 3 $m^2/g$ in the case where the raw material was obtained by a chemical synthesis method or having a specific surface area smaller than 10 $m^2/g$ in the case where the raw material was obtained by the oxide-mixing method are undesirable in that such powders have poor sintering properties and hardly give a dense sinter. In order to obtain a dense sinter from a raw-material powder whose specific surface area is smaller than 3 $m^2/g$ in the case where the raw material was obtained by a chemical synthesis method or is smaller than 10 $m^2/g$ in the case where the raw material was obtained by the oxide-mixing method, sintering (main burning) should be conducted at a temperature outside the temperature range of from 1,300° to 1,650° C. specified in this invention; sintering (main burning) outside that range is undesirable because the problems described later arise. Raw-material powders having too large a specific surface area are not too desirable in that handling thereof is difficult. The upper limit of the specific surface area is about 30 $m^2/g$ with respect to both the chemical-synthesis method and the oxide-mixing method.

In the production process of the present invention, the sintering (main burning) temperature is preferably from 1,300° to 1,650° C. as stated above, and especially preferably from 1,350° to 1,500° C. Sintering temperatures lower than 1,300° C. are undesirable in that the sintering only gives sinters having impaired mechanical properties, while sintering temperatures exceeding 1,650° C. are undesirable in that abnormal growth of crystal grains and other troubles occur and, hence, a highly tough sinter is not obtained.

Further, in the production process of the present invention, when a zirconia-based sinter is produced, in particular, through a pressure sintering treatment, the zirconia-based sinter produced can have an even higher strength. For example, the compacts obtained by CIP molding in Examples given later which compacts gave sinters having a strength of 130 $kgf/mm^2$ or higher can be made to give sinters with a strength as high as 150 $kgf/mm^2$ or higher by conducting an HIP treatment.

The grinding part material according to the present invention is then explained.

The grinding part material according to the present invention is characterized in that it employs the above-described zirconia-based sinter according to the present invention and a zirconia-based sinter obtained by the above-described production process according to the present invention, and that the zirconia-based sinter has given property values. Specifically, the grinding part material employs a zirconia-based sinter which has an average grain diameter of 2 µm or smaller and a bulk density of 5.8 g/cm$^3$ or higher and is less apt to deteriorate in long-term use at a temperature of 100° to 300° C. in the air or in water and steam. Zirconia-based sinters having an average grain diameter exceeding 2 µm are undesirable in that they have poor wear resistance and poor thermal stability. On the other hand, zirconia-based sinters having a bulk density lower than 5.8 g/cm$^3$ are undesirable in that the sinters, when used, e.g., as a grinding medium, show a low grinding efficiency and that the sinters have reduced strength property values. Further, sinters which deteriorate in the air or in water and steam at a temperature in the range of from 100° to 300° C. are undesirable in that the deterioration is accompanied by considerable decreases in all kinds of properties including wear resistance, grinding efficiency, and strength properties, so that such sinters are unsuitable, for example, for use in a wet grinding step employing water as solvent or for use in the case where the grinding part material is washed with water or the like and is then subjected to a drying step at a high temperature (around 200° C.).

The bracket material for dentition correction according to the present invention is then explained.

The bracket material for dentition correction according to the present invention is characterized in that it employs the above-described zirconia-based sinter according to the present invention and a zirconia-based sinter obtained by the above-described production process according to the present invention, and that the zirconia-based sinter employed contains from 0.0001 to 0,002% by mole $Pr_6O_{11}$ and from 0.01 to 0.2% by mole $Er_2O_3$ as colorants for enhancing the aesthetic properties of the sinter, has an average grain diameter of 2 µm or smaller and a porosity of 1% or lower, and has the property of being less apt to deteriorate in long-term use at a temperature of 100° to 300° C. in the air or in water and steam.

If the amounts of $Pr_6O_{11}$ and $Er_2O_3$ added as colorants are too small and outside the ranges specified above, the color of the sinter is too white. In contrast, if the amounts thereof are too large and outside those ranges, the sinter has a darker color than teeth. In either case, the bracket material, when bonded to teeth, gives an unnatural feeling because it differs in appearance and color tone from the teeth. Thus, colorant amounts outside the above specified ranges are undesirable from an aesthetic standpoint.

Average grain diameters exceeding 2 µm are undesirable in the zirconia-based sinter constituting the bracket material for dentition correction according to the present invention, because poor thermal stability results. On the other hand, porosities exceeding 1% are undesirable in that such a sinter does not have a glossy aesthetic appearance and has reduced strength property values. Further, sinters which deteriorate in the air or in water and steam at a temperature in the range of from 100° to 300° C. are undesirable in that the deterioration is accompanied by considerable decreases in all kinds of properties including aesthetic properties and strength properties, so that difficulties are encountered when bracket materials for dentition correction comprising such sinters are subjected to washing with water, disinfection, sterilization, or the like particularly at a high temperature (around 100° to 300° C.).

The zirconia-based sinter according to the present invention (including the zirconia-based sinter for use as the grinding part material and bracket material for dentition correction according to the present invention) is characterized in that the crystal grains thereof consist mainly of a mixed phase (T+M) made up of tetragonal crystals (T) and monoclinic crystals (M).

Since the zirconia-based sinter according to the present invention contains a stabilizer ($R_2O_3$) in an amount smaller than 2% by mole, no cubic crystals are present therein, and the crystal grains thereof mostly have a mixed phase (T+M) made up of tetragonal crystals (T) and monoclinic crystals (M). In zirconia-based sinters having such a mixed phase (T+M), an improvement in fracture toughness can be expected and such a tendency is observed. The content of monoclinic crystals in the crystalline phase of a zirconia-based sinter was determined by grinding a surface of the sinter with a #600 diamond wheel, subsequently finishing the ground surface with diamond grains of 1–5 µm to give a mirror surface, analyzing the surface by X-ray diffraction, and calculating the content from the resulting intensity ratios using the following equations (1) to (3).

$$\text{Content of monoclinic crystals } X_M = \frac{I_M(111) + I_M(11\bar{1})}{I_M(111) + I_M(11\bar{1}) + I_{T+C}(111)} \quad \text{Equation (1)}$$

$$\text{Content of tetragonal crystals } X_T = \quad \text{Equation (2)}$$

$$(100 - X_M) \times \frac{I_T(400) + I_T(400)}{I_T(400) + I_C(400) + I_T(400)}$$

$$\text{Content of cubic crystals } X_C = 100 - X_M - X_T \quad \text{Equation (3)}$$

Further, the average grain diameter for a zirconia-based sinter was determined as follows. A surface of the sinter was finished into a mirror surface in the manner described above, and the surface was etched with hydrofluoric acid. The diameter (d) of a circle equal to a given area (S) containing 50 or more grains on an electron photomicrograph was calculated using the equation $d=(4S/\pi)^{1/2}$. This diameter (d) was determined with respect to three or more fields of view in the same sample, and these diameter values were averaged to obtain the average grain diameter. The sum of the number of grains entirely contained in the given area (S) and a half of the number of grains cut by the periphery of the given area is taken as the number of grains (n) (with respect to this measurement method, see examined Japanese patent publication No. 21184/1986).

In the case of the zirconia-based sinter of the present invention having a specific composition, not only a raw material obtained by a chemical synthesis method, such as the neutralizing coprecipitation method, the hydrolytic method, the alkoxide method, or the like, but also a raw material obtained by the oxide-mixing method, which is relatively inexpensive, can be used to obtain a zirconia-based sinter having excellent thermal stability and high fracture toughness properties.

According to the grinding part material of the present invention which employs an $R_2O_3$-stabilized zirconia-based sinter containing a boron compound and a sintering aid, that is, according to the grinding part material employing a zirconia-based sinter which has the composition specified in this invention and satisfies average grain diameter and bulk density, a grinding part material is provided which has exceptionally high fracture toughness properties, is excellent in wear resistance and thermal stability, and attains high grinding efficiency.

Furthermore, according to the bracket material for dentition correction of the present invention which employs an $R_2O_3$-stabilized zirconia-based sinter containing a boron compound and a sintering aid, that is, according to the bracket material for dentition correction employing a zirconia-based sinter which has the composition specified in this invention, contains $Pr_6O_{11}$ and $Er_2O_3$ as colorants, and satisfies average grain diameter and porosity, a bracket material for dentition correction is provided which shows excellent aesthetic properties during use and has exceptionally high fracture toughness and excellent thermal stability.

The present invention will be explained below in more detail by reference to Examples of the invention along with Comparative Examples, but the invention should not be construed as being limited to the following Examples unless the spirit thereof is departed from.

[EXAMPLE 1 (including COMPARATIVE EXAMPLES)]

Zirconium oxide ($ZrO_2$), a rare earth metal oxide ($R_2O_3$: stabilizer), boron oxide ($B_2O_3$), aluminum oxide ($Al_2O_3$), and silicon dioxide ($SiO_2$) were weighed out so as to result in the compositions (Composition Nos. 1 to 26) shown in Table 1 given below. Using ion-exchanged water as solvent, each mixture was kneaded with a rubber-lined ball mill employing $ZrO_2$-based balls. Drying was then conducted.

Subsequently, calcination was conducted at the temperatures shown in Tables 2 and 3 (provided that the Composition No. 19 indicated by "Calcination temperature: 0° C." in Table 3 was not calcined). The calcined powders obtained were pulverized with the same ball mill as that used above for kneading, to such degrees as to result in the specific surface areas shown in Tables 2 and 3. An acrylic copolymer resin was added in an amount of 3% by weight, and spray granulation was conducted. The resulting powders were subjected to CIP molding at a pressure of 1,000 $kgf/cm^2$, followed by main burning at the temperatures shown in Tables 2 and 3 given below.

With respect to each zirconia-based sinter obtained, "three-point bending strength" measured in accordance with Testing Method for Bending Strength of Fine Ceramics (JIS R1601), "Vickers hardness (JIS R1610)," "fracture toughness value (JIS R1607)" determined by the IF method, and the "thermal stability" of the sinter are shown in Tables 2 and 3. The "thermal stability" of each sinter was judged by placing the sinter in an autoclave to conduct a 200-hour aging test in 200° C. hot water and then examining the sinter for deterioration.

TABLE 1

| Composition No. | Kind of stabilizer | $R_2O_3/ZrO_2$ (mol %) | $Al_2O_3$ (mol %) | $SiO_2$ (mol %) | $B_2O_3$ (mol %) | Remarks |
|---|---|---|---|---|---|---|
| 1 | $Y_2O_3$ | 1.8/98.2 | 0 | 0 | 0 | Comparative Example |
| 2 | " | " |  | 0.3 | 0 | Comparative Example |
| 3 | " | " | 0 | 0 | 2 | Example |
| 4 | " | " | 0 | 0 | 8 | Example |
| 5 | " | " | 0 | 0 | 12 | Comparative Example |
| 6 | " | " | 1 | 0 | 1 | Example |
| 7 | " | " | 0 | 0.3 | 1 | Example |
| 8 | " | " | 1 | 0.3 | 0.05 | Example |
| 9 | " | " | 1 | 0.3 | 1 | Example |
| 10 | " | " | 1 | 0.3 | 12 | Comparative Example |
| 11 | " | " | 0.1 | 0.3 | 1 | Example |
| 12 | " | " | 5 | 0.3 | 1 | Example |
| 13 | " | " | 10 | 0.3 | 1 | Comparative Example |
| 14 | " | " | 1 | 1.5 | 1 | Example |
| 15 | " | " | 1 | 3 | 1 | Comparative Example |
| 16 | " | 1.5/98.5 | 1 | 0.3 | 1 | Example |
| 17 | " | 1.3/98.7 | 1 | 0.3 | 1 | Example |
| 18 | " | 1/99 | 1 | 0.3 | 1 | Comparative Example |
| 19 | " | 1.9/98.1 | 1 | 0.3 | 1 | Example |
| 20 | " | 2.5/97.5 | 1 | 0.3 | 1 | Comparative Example |
| 21 | $Yb_2O_3$ | 1.8/98.2 | 1 | 0.3 | 1 | Example |
| 22 | $Er_2O_3$ | " | 1 | 0.3 | 1 | Example |
| 23 | $Ho_2O_3$ | " | 1 | 0.3 | 1 | Example |
| 24 | $Dy_2O_3$ | " | 1 | 0.3 | 1 | Example |
| 25 | $Y_2O_3 + Dy_2O_3$ | (1 + 0.8)/98.1 | 1 | 0.1 | 0.5 | Example |
| 26 | $Y_2O_3 + Ho_2O_3$ | " | 1 | 0.1 | 0.5 | Example |

TABLE 2

Production Conditions and Properties

| Composition No. | Calcination temperature (°C.) | Specific surface area (m²/g) | Main burning temperature (°C.) | Average crystal grain diameter (μm) | Crystalline phase | Bending strength (kgf/mm²) | Vickers hardness, hardness symbol: HV10 | Fracture toughness value MPa√m | Thermal stability | Remarks |
|---|---|---|---|---|---|---|---|---|---|---|
| 1 | 1000 | 15 | 1500 | 0.7 | M + T | 32.12 | 802 | 4.47 | poor | Comparative Example |
| 2 | 1000 | 15 | 1500 | 0.7 | M + T | 105.33 | 1100 | 12.15 | poor | Comparative Example |
| 3 | 1000 | 15 | 1500 | 0.8 | M + T | 110.11 | 1072 | 11.67 | good | Example |
| 4 | 1000 | 15 | 1450 | 0.6 | M + T | 107.21 | 1006 | 12.74 | good | Example |
| 5 | 1000 | 15 | 1500 | 0.8 | M + T | 100.05 | 1011 | 10.67 | poor | Comparative Example |
| 6 | 1000 | 15 | 1500 | 0.7 | M + T | 121.34 | 1102 | 12.40 | good | Example |
| 7 | 1000 | 15 | 1500 | 0.7 | M + T | 109.82 | 1032 | 11.07 | good | Example |
| 8 | 1000 | 15 | 1500 | 0.7 | M + T | 102.24 | 1103 | 12.41 | good | Example |
| 9 | 1000 | 15 | 1500 | 0.7 | M + T | 120.83 | 1069 | 12.36 | good | Example |
|  | 1000 | 6 | 1500 | 1.0 | M + T | 21.67 | — | — | poor | Comparative Example |
|  | 1000 | 25 | 1400 | 0.6 | M + T | 98.67 | 1000 | 13.11 | good | Example |
| 10 | 1000 | 15 | 1450 |  | microcracks were present in the sinter |  |  |  |  | Comparative Example |
| 11 | 1000 | 15 | 1550 | 0.7 | M + T | 107.66 | 1037 | 12.25 | good | Example |
| 12 | 1000 | 15 | 1500 | 0.7 | M + T | 117.51 | 1234 | 10.73 | good | Example |
| 13 | 1000 | 15 | 1550 | 0.9 | M + T | 110.03 | 1311 | 6.11 | good | Comparative Example |
| 14 | 1000 | 15 | 1500 | 0.7 | M + T | 97.89 | 1088 | 11.63 | good | Example |
| 15 | 1000 | 15 | 1500 | 0.8 | M + T | 79.66 | 1050 | 10.63 | poor | Comparative Example |
| 16 | 800 | 15 | 1500 | 0.6 | M + T | 107.67 | 1031 | 11.30 | good | Example |
| 17 | 800 | 20 | 1500 | 0.5 | M + T | 98.99 | 1002 | 10.69 | good | Example |
| 18 | 800 | 20 | 1500 |  | unsintered |  |  |  |  | Comparative Example |

[note] crystalline phase
M: monoclinic phase,
T: tetragonal phase

TABLE 3

Production Conditions and Properties

| Composition No. | Calcination temperature (°C.) | Specific surface area (m²/g) | Main burning temperature (°C.) | Average crystal grain diameter (μm) | Crystalline phase | Bending strength (kgf/mm²) | Vickers hardness, hardness symbol: HV10 | Fracture toughness value MPa√m | Thermal stability | Remarks |
|---|---|---|---|---|---|---|---|---|---|---|
| 19 | 1000 | 12 | 1500 | 0.7 | M + T | 131.69 | 1180 | 13.11 | good | Example |
|  | 500 | 17 | 1500 | 0.6 | M + T | 130.21 | 1097 | 13.50 | good | Example |
|  | 1200 | 12 | 1500 | 0.7 | M + T | 123.07 | 1111 | 12.78 | good | Example |
|  | 1400 | 7 | 1500 | 0.8 | M + T | 11.63 | — | — | poor | Comparative Example |
|  | 0 | 17 | 1500 | 0.7 | M + T | 60.10 | 970 | 4.11 | good | Comparative Example |
| 20 | 1000 | 15 | 1500 | 0.9 | T | 131.45 | 1200 | 7.10 | poor | Comparative Example |
| 21 | 1000 | 15 | 1500 | 0.7 | M + T | 121.19 | 1049 | 12.63 | good | Example |
|  | 800 | 30 | 1350 | 0.5 | M + T | 111.11 | 1008 | 13.55 | good | Example |
|  | 800 | 15 | 1700 |  | reaction occurred with the burning table |  |  |  |  | Comparative Example |
|  | 1000 | 15 | 1200 | 0.5 | M + T | 2.09 | — | — | poor | Comparative Example |
| 22 | 1000 | 15 | 1500 | 0.7 | M + T | 117.66 | 1112 | 11.11 | good | Example |
| 23 | 1000 | 15 | 1500 | 0.7 | M + T | 90.27 | 1094 | 9.74 | good | Example |
| 24 | 1000 | 15 | 1500 | 0.7 | M + T | 88.40 | 1095 | 9.66 | good | Example |
| 25 | 800 | 12 | 1550 | 0.6 | M + T | 109.00 | 1088 | 10.99 | good | Example |
| 26 | 1200 | 10 | 1600 | 0.7 | M + T | 96.66 | 1133 | 10.42 | good | Example |

[note] crystal phase
M: monoclinic phase,
T: tetragonal phase

From Tables 2 and 3 given above, it is understood that zirconia-based sinters not only showing high strength and a high fracture toughness value but having satisfactory thermal stability are obtained in Example 1, in which the molar proportion of a stabilizer ($R_2O_3$) to $ZrO_2$ is within the range specified in this invention and the compositions contain a boron compound in a given range (or a boron compound in a given range and $Al_2O_3$ and/or $SiO_2$). In contrast, the zirconia-based sinter of the present invention cannot be obtained from the compositions which are outside at least one of the aforementioned given ranges specified in this invention, or from the compositions containing no boron (B) component. For example, Composition No. 18 ($R_2O_3/ZrO_2$= 1/99) as a Comparative Example, which was outside the range "$R_2O_3/ZrO_2$=1.3/98.7 to 2/98, excluding 2/98" specified in this invention, did not sinter because of the too small stabilizer ($Y_2O_3$) amount, and Composition No. 20 ($R_2O_3/ZrO_2$=2.5/97.5) as a Comparative Example, which was also outside that range, gave a fracture toughness value as low as 7.10 MPa√m. Thus, the desired zirconia-based sinter was unable to be obtained from these compositions.

Further, Composition Nos. 1 and 2 as Comparative Examples, which contained no boron (B) component, and Composition No. 5, which contained a boron (B) component in an amount exceeding the range specified in this invention, gave sinters having poor thermal stability as apparent from Table 2, even through these compositions were within the $R_2O_3/ZrO_2$ molar proportion range specified in this invention.

Furthermore, even when raw-material blends prepared so that the molar proportion of a stabilizer ($R_2O_3$) to $ZrO_2$ is within the range specified in this invention and that the additives according to the present invention (a boron compound and $Al_2O_3$ and/or $SiO_2$) are within the respective ranges specified in this invention are used, the zirconia-based sinter of the present invention cannot be obtained therefrom when calcination is performed under conditions outside the range of from 500° to 1,200° C. or when the specific surface area of the raw material or the conditions for main burning are outside the ranges specified in this invention. For example, in the case of a Comparative Example in which calcination was conducted at 1,400° C., which is outside the range specified in this invention (500° to 1,200° C.), and a Comparative Example in which calcination was omitted (see Composition No. 19 in Table 3), the former gave a sinter having a bending strength as extremely low as 11.63 kgf/mm² and the latter gave a sinter having a low fracture toughness value (4.11 MPa√m).

Moreover, Composition No. 9 shown in Table 2 which employed a raw material having a specific surface area of 6 m²/g, which is outside the range specified in this invention (10 m²/g or larger for the oxide-mixing method), gave a sinter having a low bending strength and poor thermal stability. Further, with respect to the Comparative Examples in which sintering (main burning) was conducted at 1,700° C. and 1,200° C. (see Composition No. 21 in Table 3), which are outside the range specified in this invention (1,300° to 1,650° C.), the sinter obtained from the former through high-temperature sintering had undergone a reaction with the burning table, while the sinter obtained from the latter through low-temperature sintering had a bending strength as extremely low as 2.09 kgf/mm². Thus, both compositions failed to give the high-toughness zirconia-based sinter desired in this invention.

[EXAMPLE 2 (including COMPARATIVE EXAMPLES)]

A raw material obtained by the neutralizing coprecipitation method and containing either 1–2.5% by mole $Y_2O_3$ or 1.8% by mole $Yb_2O_3$ was mixed with weighed amounts of $B_2O_3$, $Al_2O_3$, and $SiO_2$ so as to result in the compositions (Composition Nos. 27 to 47) shown in Table 4 given below. Using ion-exchanged water as solvent, each mixture was kneaded with a rubber-lined ball mill employing $ZrO_2$-based balls. Drying was then conducted.

TABLE 1

| Composition No. | Kind of stabilizer | Composition | | | | Remarks |
| | | $R_2O_3/ZrO_2$ (mol %) | $Al_2O_3$ (mol %) | $SiO_2$ (mol %) | $B_2O_3$ (mol %) | |
| --- | --- | --- | --- | --- | --- | --- |
| 27 | $Y_2O_3$ | 1.8/98.2 | 0 | 0 | 0 | Comparative Example |
| 28 | " | " | 1 | 0.3 | 0 | Comparative Example |
| 29 | " | " | 0 | 0 | 2 | Example |
| 30 | " | " | 0 | 0 | 8 | Example |
| 31 | " | " | 0 | 0 | 12 | Comparative Example |
| 32 | " | " | 1 | 0 | 1 | Example |
| 33 | " | " | 0 | 0.3 | 1 | Example |
| 34 | " | " | 1 | 0.3 | 0.05 | Example |
| 35 | " | " | 1 | 0.3 | 1 | Example |
| 36 | " | " | 1 | 0.3 | 12 | Comparative Example |
| 37 | " | " | 0.1 | 0.3 | 1 | Example |
| 38 | " | " | 5 | 0.3 | 1 | Example |
| 39 | " | " | 10 | 0.3 | 1 | Comparative Example |
| 40 | " | " | 1 | 1.5 | 1 | Example |
| 41 | " | " | 1 | 3 | 1 | Comparative Example |
| 42 | " | 1.5/98.5 | 1 | 0.3 | 1 | Example |
| 43 | " | 1.3/98.7 | 1 | 0.3 | 1 | Example |
| 44 | " | 1/99 | 1 | 0.3 | 1 | Comparative Example |
| 45 | " | 1.9/98.1 | 1 | 0.3 | 1 | Example |
| 46 | " | 2.5/97.5 | 1 | 0.3 | 1 | Comparative Example |
| 47 | $Yb_2O_3$ | 1.8/98.2 | 1 | 0.3 | 1 | Example |

Subsequently, calcination was conducted at the temperatures shown in Tables 5 and 6 given below (provided that the Composition No. 45 indicated by "Calcination temperature: 0° C." in Table 6 was not calcined). The calcined powders obtained were pulverized with the same ball mill as that used above for kneading, to such degrees as to result in the specific surface areas shown in Tables 5 and 6. An acrylic copolymer resin was added in an amount of 3% by weight, and spray granulation was conducted. The resulting powders were subjected to CIP molding at a pressure of 1,000 kgf/cm², followed by main burning at the temperatures shown in Tables 5 and 6.

Each zirconia-based sinter obtained was examined for "three-point bending strength," "Vickers hardness," "fracture toughness value," and "thermal stability" by the evaluation methods shown in Example 1 given above. The results thereof are shown in Tables 5 and 6.

proportion of a stabilizer ($R_2O_3$) to $ZrO_2$ is within the range specified in this invention and the compositions contain a boron compound in a given range (or a boron compound in a given range and $Al_2O_3$ and/or $SiO_2$).

TABLE 5

Production Conditions and Properties

| Composition No. | Calcination temperature (°C.) | Specific surface area (m²/g) | Main burning temperature (°C.) | Average crystal grain diameter (μm) | Crystalline phase | Bending strength (kgf/mm²) | Vickers hardness, hardness symbol: HV10 | Fracture toughness value MPa√m | Thermal stability | Remarks |
|---|---|---|---|---|---|---|---|---|---|---|
| 27 | 1000 | 8 | 1450 | 0.7 | M + T | 42.22 | 813 | 4.49 | poor | Comparative Example |
| 28 | 1000 | 8 | 1450 | 0.7 | M + T | 115.43 | 1125 | 12.04 | poor | Comparative Example |
| 29 | 1000 | 8 | 1450 | 0.8 | M + T | 120.21 | 1191 | 11.77 | good | Example |
| 30 | 1000 | 8 | 1400 | 0.6 | M + T | 117.31 | 1020 | 12.54 | good | Example |
| 31 | 1000 | a | 1450 | 0.8 | M + T | 110.16 | 1023 | 10.32 | poor | Comparative Example, |
| 32 | 1000 | 8 | 1450 | 0.7 | M + T | 131.30 | 1150 | 12.19 | good | Example |
| 33 | 1000 | 8 | 1450 | 0.7 | M + T | 115.27 | 1089 | 10.98 | good | Example |
| 34 | 1000 | 8 | 1450 | 0.7 | M + T | 112.25 | 1130 | 12.14 | good | Example |
| 35 | 1000 | 8 | 1450 | 0.7 | M + T | 130.96 | 1092 | 12.27 | good | Example |
|  | 1000 | 3 | 1450 | 1.0 | M + T | 31.78 | — | — | poor | Comparative Example |
|  | 1000 | 25 | 1350 | 0.6 | M + T | 108.78 | 1021 | 13.21 | good | Example |
| 36 | 1000 | 8 | 1400 |  | microcracks were present in the sinter |  |  |  |  | Comparative Example |
| 37 | 1000 | 8 | 1500 | 0.7 | M + T | 117.87 | 1040 | 12.43 | good | Example |
| 38 | 1000 | 8 | 1450 | 0.7 | M + T | 127.72 | 1245 | 11.01 | good | Example |
| 39 | 1000 | 8 | 1500 | 0.9 | M + T | 120.13 | 1322 | 6.23 | good | Comparative Example |
| 40 | 1000 | 8 | 1450 | 0.7 | M + T | 107.60 | 1095 | 12.02 | good | Example |
| 41 | 1000 | 8 | 1450 | 0.8 | M + T | 89.55 | 1071 | 10.54 | poor | Comparative Example |
| 42 | 800 | 10 | 1450 | 0.6 | M + T | 117.85 | 1043 | 11.70 | good | Example |
| 43 | 800 | 10 | 1450 | 0.5 | M + T | 109.20 | 1015 | 10.80 | good | Example |
| 44 | 800 | 10 | 1450 |  | unsintered |  |  |  |  | Comparative Example |

[note] crystalline phase
M: monoclinic phase,
T: tetragonal phase

TABLE 6

Production Conditions and Properties

| Composition No. | Calcination temperature (°C.) | Specific surface area (m²/g) | Main burning temperature (°C.) | Average crystal grain diameter (μm) | Crystalline phase | Bending strength (kgf/mm²) | Vickers hardness, hardness symbol: HV10 | Fracture toughness value MPa√m | Thermal stability | Remarks |
|---|---|---|---|---|---|---|---|---|---|---|
| 45 | 1000 | 8 | 1450 | 0.7 | M + T | 141.70 | 1190 | 13.20 | good | Example |
|  | 500 | 12 | 1450 | 0.6 | M + T | 140.92 | 1202 | 13.49 | good | Example |
|  | 1200 | 5 | 1450 | 0.7 | M + T | 129.31 | 1123 | 11.99 | good | Example |
|  | 1400 | 2 | 1450 | 0.8 | M + T | 20.39 | — | — | poor | Comparative Example |
|  | 0 | 10 | 1450 | 0.7 | M + T | 72.50 | 980 | 5.21 | good | Comparative Example |
| 46 | 1000 | 8 | 1450 | 0.9 | T | 139.00 | 1209 | 7.01 | good | Comparative Example |
| 47 | 1000 | 8 | 1450 | 0.7 | M + T | 131.20 | 1050 | 12.54 | good | Example |
|  | 800 | 30 | 1350 | 0.6 | M + T | 121.25 | 1018 | 13.60 | good | Example |
|  | 800 | 8 | 1700 |  | reaction occurred with the burning table |  |  |  |  | Comparative Example |
|  | 1000 | 8 | 1200 | 0.5 | M + T | 8.72 | — | — | poor | Comparative Example |

[note] crystal phase
M: monoclinic phase,
T: tetragonal phase

From Tables 5 and 6 given above, it is understood that zirconia-based sinters not only showing high strength and a high fracture toughness value but having satisfactory thermal stability are obtained in Example 2, in which the molar In contrast, the zirconia-based sinter of the present invention cannot be obtained from the compositions which are outside at least one of the aforementioned given ranges specified in this invention, or from the compositions containing no boron (B) component. For example, Composition No. 44 ($R_2O_3/ZrO_2=1/99$) as a Comparative Example, which was outside the range "$R_2O_3/ZrO_2=3/98.7$ to 2/98, excluding 2/98" specified in this invention, did not sinter because of the too small stabilizer ($Y_2O_3$) amount, and Composition No. 46 ($R_2O_3/ZrO_2=2.5/97.5$) as a Comparative Example, which was also outside that range, gave a fracture toughness value as low as 7.01 MPa√m. Thus, the desired zirconia-based sinter was unable to be obtained from these compositions.

Further, Composition Nos. 27 and 28 as Comparative Examples, which contained no boron (B) component, and Composition No. 31, which contained a boron (B) component in an amount exceeding the range specified in this invention, gave sinters having poor thermal stability as apparent from Table 5, even through these compositions were within the $R_2O_3/ZrO_2$ molar proportion range specified in this invention.

Furthermore, even when raw-material blends prepared so that the molar proportion of a stabilizer ($R_2O_3$) to $ZrO_2$ is within the range specified in this invention and that the additives according to the present invention (a boron compound and $Al_2O_3$ and/or $SiO_2$) are within the respective ranges specified in this invention are used, the zirconia-based sinter of the present invention cannot be obtained therefrom when calcination is performed under conditions outside the range of from 500° to 1,200° C. or when the specific surface area of the raw material or the conditions for main burning are outside the ranges specified in this invention. For example, in the case of a Comparative Example in which calcination was conducted at 1,400° C., which is outside the range specified in this invention (500° to 1,200° C.), and a Comparative Example in which calcination was omitted (see Composition No. 45 in Table 6), the former gave a sinter having a bending strength as extremely low as 20.39 kgf/mm² and the latter gave a sinter having a low fracture toughness value (5.21 MPa√m).

Moreover, Composition No. 45 shown in Table 6 which employed a raw material having a specific surface area of 2 m²/g, which is outside the range specified in this invention (3 m²/g or larger for the chemical-synthesis method), gave a sinter having a low bending strength and poor thermal stability. Further, with respect to the Comparative Examples in which sintering (main burning) was conducted at 1,700° C. and 1,200° C. (see Composition No. 47 in Table 6), which are outside the range specified in this invention (1,300° to 1,650° C.), the sinter obtained from the former through high-temperature sintering had undergone a reaction with the burning table, while the sinter obtained from the latter through low-temperature sintering had a bending strength as extremely low as 8.72 kgf/mm². Thus, both compositions failed to give the zirconia-based sinter desired in this invention.

[EXAMPLE 3 (including COMPARATIVE EXAMPLES)]

Raw materials prepared by the method described in Example 1 given above (which were Composition Nos. 2, 9, and 20 in Table 1; calcination temperature: 1,000° C., specific surface area: 10 m²/g) were used and molded into such a shape as to give, through sintering, a ball having a diameter of ½ inch. These moldings were burned at 1,500° C. to produce grinding media.

Using the grinding media obtained, an abrasion test was performed. In the abrasion test, 3.6 kg of a sample medium was placed in a 2-liter alumina-based ball mill pot together with 800 cc of water and a fused alumina powder (#325), and the pot was rotated at a rotational speed of 100 rpm for 48 hours to measure the resulting decrease of the medium weight through the test. From this decrease, the wear rate of the grinding medium used was determined. Further, the wear rate was determined after conducting a hot-water test, that is, after a 200-hour aging test in 200° C. hot water placed in an autoclave. The results thereof are shown in Table 7.

TABLE 7

| | Grinding Medium Properties | | | | | |
|---|---|---|---|---|---|---|
| Composition No. | Average crystal grain diameter (μm) | Bulk density (g/m³) | Crystalline phase | Wear rate (%) | Wear rate after hot-water test (%) | Remarks |
| 2 | 0.7 | 6.03 | M + T | 0.38 | 8.20 | Comparative Example |
| 9 | 0.7 | 6.03 | M + T | 0.38 | 0.38 | Example |
| 20 | 0.9 | 6.06 | T | 0.52 | 0.52 | Comparative Example |

As apparent from Table 7 given above, the grinding part material (grinding medium) employing a zirconia-based sinter of the present invention (Composition No. 9) was ascertained to have a low wear rate and excellent thermal stability and, in particular, to undergo little change in wear rate through the hot-water test.

[EXAMPLE 4 (including COMPARATIVE EXAMPLES)]

Raw materials prepared by the method described in Example 1 given above (which were Composition Nos. 2, 9, and 20 in Table 1; calcination temperature: 1,000° C., specific surface area: 10 m2/g) were used. Thereto were added weighed amounts of $Pr_6O_{11}$ and $Er_2O_3$ as colorants so as to result in the compositions shown in Table 8. Using ion-exchanged water as solvent, each mixture was kneaded with a rubber-lined ball mill employing $ZrO_2$-based balls. Drying was then conducted. In order to produce compounds for injection molding, a resin and a wax were added to the resulting compositions serving as starting materials, and the mixtures each was heated and kneaded with a heated kneader and then pelletized for stable feeding to an injection molding machine. Subsequently, the above-described compounds (pellets) each was introduced into an "injection molding machine having a mold designed to have the given desired shape of a bracket for dentition correction" and molded. These moldings were heated at a temperature of about 350° C. to decompose and eliminate the resin contained in the compounds, and were then sintered at 1,500° C.

Surfaces of the thus-obtained brackets for dentition correction were polished. The brackets were examined for "Vickers hardness (JIS R1610)" and "fracture toughness value (JIS R1607)" and evaluated for "thermal stability" by the same methods as in Example 1 given above. Further, the brackets were also examined for "three-point bending strength." The results thereof are shown in Table 8. The test pieces used in examining the "three-point bending strength" were produced by injection molding under the same conditions as for the formation of the bracket shape for dentition correction so that the samples had the shape according to Testing Method for Bending Strength of Fine Ceramics (JIS R1601).

a given raw-material composition, calcining the blend at a given temperature (500° to 1,200° C.), subjecting the calcination product to a pulverization step to obtain a raw-material powder having a specific surface area (which is 3 $m^2/g$ or larger when the blend was obtained by a chemical synthesis method, or is 10 $m^2/g$ or larger when the blend was obtained by the oxide-mixing method), subsequently molding the raw-material powder, and then sintering the molding at a given temperature (1,300° to 1,650° C.). According to this process of the present invention, sintering can be

TABLE 8

Properties of Bracket for Dentition Correction

| Composition No. | Amount of colorant (mol %) | | Average crystal grain diameter (μm) | Porosity (%) | Bending strength (kgf/mm$^2$) | Vickers hardness [HV10] | Fracture toughness value MPa√m | Color tone | Thermal stability | Remarks |
|---|---|---|---|---|---|---|---|---|---|---|
| | $Pr_6O_{11}$ | $Er_2O_3$ | | | | | | | | |
| 2 | 0.0005 | 0.08 | 0.7 | 0.2 | 100.41 | 1070 | 11.95 | ivory + transparent appearance | poor | Comparative Example |
| 9 | 0.00009 | 0.007 | 0.7 | 0.2 | 117.38 | 1072 | 11.97 | whitish light yellow | good | Comparative Example |
| | 0.0001 | 0.01 | 0.7 | 0.2 | 118.07 | 1078 | 12.31 | ivory + transparent appearance | good | Example |
| | 0.0005 | 0.08 | 0.7 | 0.2 | 118.72 | 1065 | 12.21 | ivory + transparent appearance | good | Example |
| | 0.002 | 0.2 | 0.7 | 0.2 | 119.45 | 1080 | 12.14 | ivory + transparent appearance | good | Example |
| | 0.0025 | 0.25 | 0.7 | 0.2 | 117.92 | 1081 | 12.09 | brownish ivory | good | Comparative Example |
| 20 | 0.0005 | 0.08 | 0.9 | 0.1 | 115.27 | 1180 | 6.20 | ivory + transparent appearance | good | Comparative Example |

As apparent from Table 8, it was ascertained that the zirconia-based brackets for dentition correction of the present invention show excellent values of sinter properties in all of three-point bending strength, Vickers hardness, and fracture toughness value as in Example 1, even when compared with zirconia ceramic materials on the market, and that with respect to thermal stability, the surfaces of the brackets undergo no change in quality. Thus, it was suggested that the brackets of this invention are utterly satisfactory when disinfection conditions or conditions for ordinary use in the mouth are taken in account, Further, in the case where the addition amounts of $Pr_6O_{11}$ and $Er_2O_3$ were smaller than the amounts specified in this invention, the bracket was too white (assumed a whitish light yellow color). In contrast, in the case of too large colorant amounts, the bracket was darker than teeth (assumed a brownish ivory color). Thus, in either case, the bracket material, when bonded to teeth, gave an unnatural feeling and were aesthetically undesirable because it differed in appearance and color tone from the teeth.

POSSIBILITY OF INDUSTRIAL APPLICATION

The zirconia-based sinter according to the present invention is characterized as comprising $ZrO_2$ as the main component, a rare earth metal oxide ($R_2O_3$) in a given range, and a boron compound in a given range (or a boron compound in a given range and $Al_2O_3$ and/or $SiO_2$ in a given range). Due to this, a zirconia-based sinter excellent in thermal stability and fracture toughness properties can be provided.

Further, the process according to the present invention for producing a zirconia-based sinter is characterized as comprising preparing a raw-material blend by a chemical synthesis method or the oxide-mixing method so as to result in conducted at a relatively low temperature. In addition, the present invention brings about an effect that a zirconia-based sinter having exceptionally high toughness and excellent thermal stability can be produced not only through production by a chemical synthesis method but through the oxide-mixing method, which is a relatively inexpensive production method.

Moreover, according to the present invention, it is possible to provide a zirconia-based sinter which has various properties including high toughness, lubricity, heat-insulating properties, thermal expansion characteristics, and oxygen ion conductivity and which, taking advantage of these properties, is expected to be industrially used in wide application fields. It is also possible to provide at low cost a zirconia-based sinter having excellent thermal stability and exceedingly high toughness. Thus, the industrial usefulness thereof is extremely high.

Furthermore, according to the grinding part material employing a zirconia-based sinter having the composition according to the present invention, a grinding part material having high strength and high toughness, excellent in wear resistance and thermal stability, and having a high grinding efficiency is provided.

The grinding part material of the present invention having such properties is industrially extremely useful as a grinding part material, e.g., a lining material or a grinding medium, for use in various grinding apparatus for the dry or wet fine pulverization of particles of ceramics, metals, organic polymers, etc. Moreover, according to the bracket material for dentition correction employing a zirconia-based sinter having the composition according to the present invention, a bracket material for dentition correction which has high strength, high hardness, and high toughness and is excellent in aesthetic property during use and thermal stability can be provided.

We claim:

1. A zirconia-based sinter, comprising $ZrO_2$ as a main component, one or more rare earth metal oxides represented by the formula $R_2O_3$, the rare earth metal oxides being selected from the group consisting of $Yb_2O_3$, $Er_2O_3$, $Ho_2O_3$, $Y_2O_3$, and $Dy_2O_3$, and a boron compound having an equivalent boron oxide content of 0.05 to 8% by mole, wherein the one or more rare earth metal oxides and the $ZrO_2$ are present in the sinter in a molar proportion of $R_2O_3/ZrO_2$ of from 1.3/98.7 to 2/98, excluding 2/98, and the sinter contains crystal grains consisting mainly of a mixed phase made up of tetragonal crystals and monoclinic crystals.

2. A zirconia-based sinter, comprising $ZrO_2$ as a main component, one or more rare earth metal oxides represented by the formula $R_2O_3$, the rare earth metal oxides being selected from the group consisting of $Yb_2O_3$, $Er_2O_3$, $Ho_2O_3$, $Y_2O_3$, and $Dy_2O_3$, a boron compound, and $Al_2O_3$ and/or $SiO_2$, the boron compound having an equivalent boron oxide content of 0.05 to 8% by mole, wherein the one or more rare earth metal oxides and the $ZrO_2$ are present in the sinter in a molar proportion of $R_2O_3/ZrO_2$ of from 1.3/98.7 to 2/98, excluding 2/98, the content of $Al_2O_3$ is from 0.1 to 5% by mole and/or the content of $SiO_2$ is from 0.05 to 1.5% by mole, and the sinter contains crystal grains consisting mainly of a mixed phase made up of tetragonal crystals and monoclinic crystals.

3. The zirconia-based sinter as claimed in claim 1 or 2, wherein the boron compound is boron oxide, boron nitride, boron carbide, or a compound of boron and an element selected from the group consisting of Zr, Al, Si, Yb, Er, Ho, Y and Dy.

4. A process for producing a zirconia-based sinter comprising $ZrO_2$ as a main component, one or more rare earth metal oxides represented by the formula $R_2O_3$, the rare earth metal oxides being selected from the group consisting of $Yb_2O_3$, $Er_2O_3$, $Ho_2O_3$, $Y_2O_3$, and $Dy_2O_3$, and a boron compound or a boron compound and $Al_2O_3$ and/or $SiO_2$, comprising the steps of:

(1) preparing a raw-material blend by a chemical synthesis method, or by an oxide-mixing method whereby the blend has a raw-material composition containing the one or more rare earth metal oxides and the $ZrO_2$ in a molar proportion of $R_2O_3/ZrO_2$ from 1.3/98.7 to 2/98, excluding 2/98, the boron compound having an equivalent boron oxide content of from 0.05 to 8% by mole and optionally a content of the $Al_2O_3$ of from 0.1 to 5% by mole and/or a content of the $SiO_2$ of from 0.05 to 1.5% by mole, (2) calcining the raw-material blend at 500° to 1,200° C. to form a calcination product, (3) pulverizing the calcination product to obtain a powder having a specific surface area of 3 $m^2/g$ or larger when the raw-material blend is obtained by a chemical synthesis method or of 10 $m^2/g$ or larger when the raw-material blend is obtained by the oxide-mixing method, (4) molding the powder obtained by the pulverization, and (5) sintering the molding at 1,300° to 1,650° C.

5. A grinding part material comprising the zirconia-based sinter as claimed in claim 1 or 2, a zirconia-based sinter obtained by the process as claimed in claim 4, wherein the sinter has an average grain diameter of 2 μm or smaller and a bulk density of 5.8 $g/cm^3$ or higher and is resistant to deterioration in long-term use at a temperature of 100° to 300° C. in air, water or steam.

6. A bracket material for dental correction comprising the zirconia-based sinter as claimed in claim 1 or 2 or of a zirconia-based sinter obtained by the process as claimed in claim 4, wherein the sinter contains from 0.0001 to 0.002% by mole $Pr_6O_{11}$ and from 0.01 to 0.2% by mole $Er_2O_3$ as colorants for enhancing the aesthetic properties of the sinter, and the sinter has an average grain diameter of 2 μm or smaller and a porosity of 1% or lower and is resistant to deterioration in long-term use at a temperature of 100° to 300° C. in air, water or steam.

* * * * *